United States Patent [19]

Hamai

[11] 4,276,865
[45] Jul. 7, 1981

[54] DIESEL ENGINE HAVING A SUBCHAMBER

[75] Inventor: Kyugo Hamai, Yokosuka, Japan

[73] Assignee: Nissan Motor Company, Limited, Yokohama, Japan

[21] Appl. No.: 48,784

[22] Filed: Jun. 15, 1979

[30] Foreign Application Priority Data

Jun. 22, 1978 [JP] Japan .................................. 53/75578

[51] Int. Cl.³ ............................................. F02B 47/08
[52] U.S. Cl. ..................................... 123/569; 123/571; 123/568
[58] Field of Search ............... 123/119 A, 568, 569, 123/571

[56] References Cited

U.S. PATENT DOCUMENTS

| | | | |
|---|---|---|---|
| 2,701,556 | 2/1955 | Woerner | 123/119 A |
| 3,702,111 | 11/1972 | Weaving et al. | 123/119 A |
| 3,703,164 | 11/1972 | Weaving | 123/119 A |
| 4,020,808 | 5/1977 | Yagi et al. | 123/568 |
| 4,109,625 | 8/1978 | Kawamura et al. | 123/569 |
| 4,156,414 | 5/1977 | Kawamura et al. | 123/119 A |
| 4,192,265 | 3/1980 | Amano | 123/119 A |
| 4,193,382 | 3/1980 | Oshima | 123/119 A |

*Primary Examiner*—Wendell E. Burns
*Attorney, Agent, or Firm*—Lowe, King, Price & Becker

[57] ABSTRACT

A Diesel engine having a subchamber in the cylinder head in which the exhaust gas recirculating (EGR) passageway is coupled to the subchamber with a valve means controlled in synchronism with the rotation of the engine so that only the minimum necessary amount of EGR gas is present exclusively in the subchamber at the beginning stage of engine combustion in order to decrease the generation of NOx products while maintaining good combustion.

5 Claims, 8 Drawing Figures

FIG_1
PRIOR ART
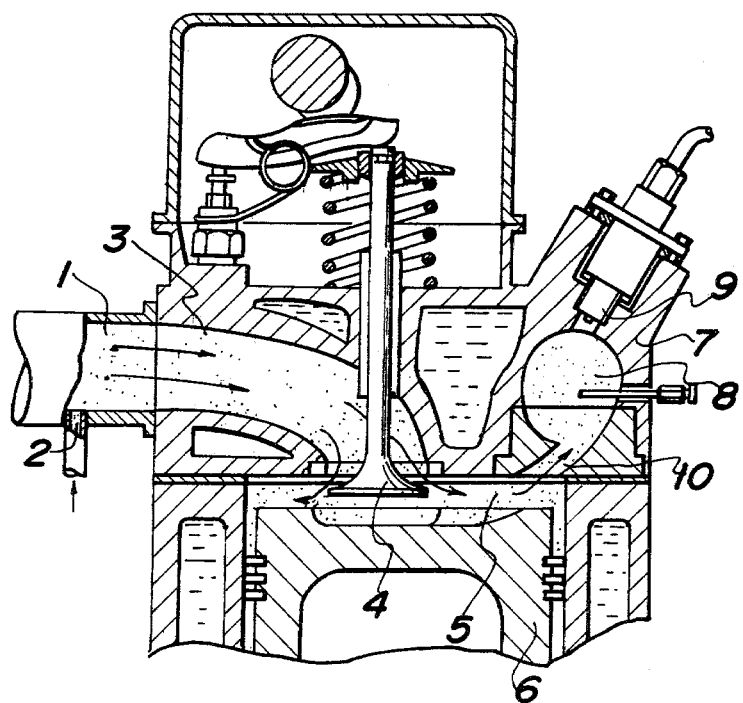

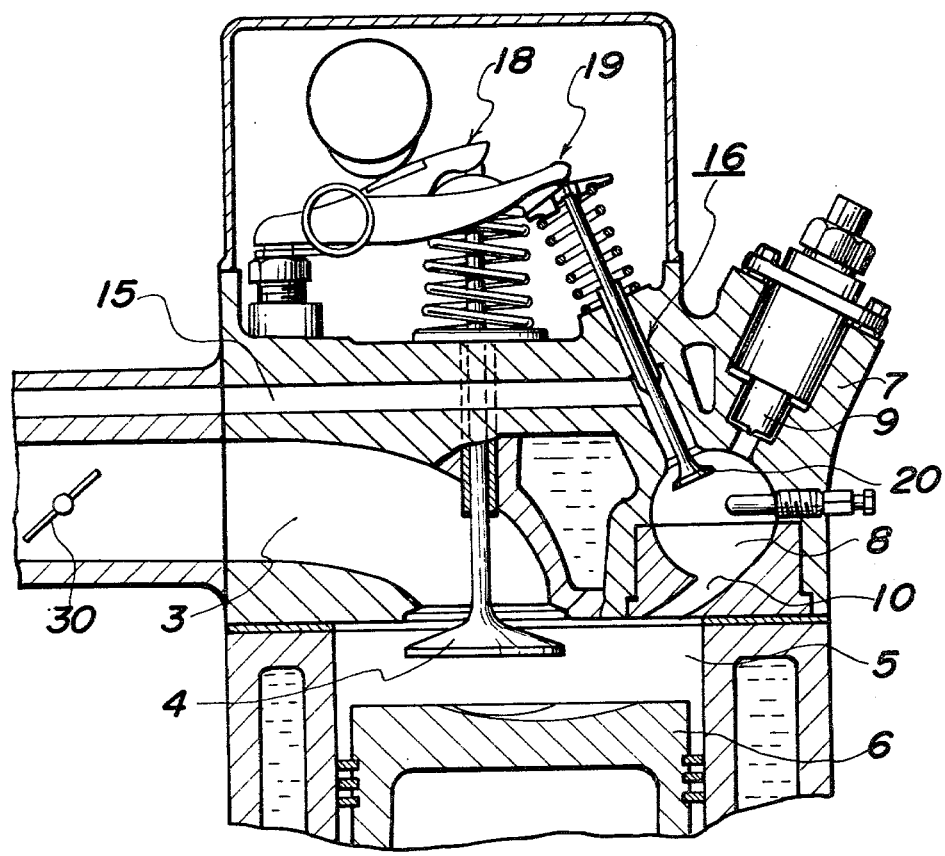
FIG_2

FIG_3
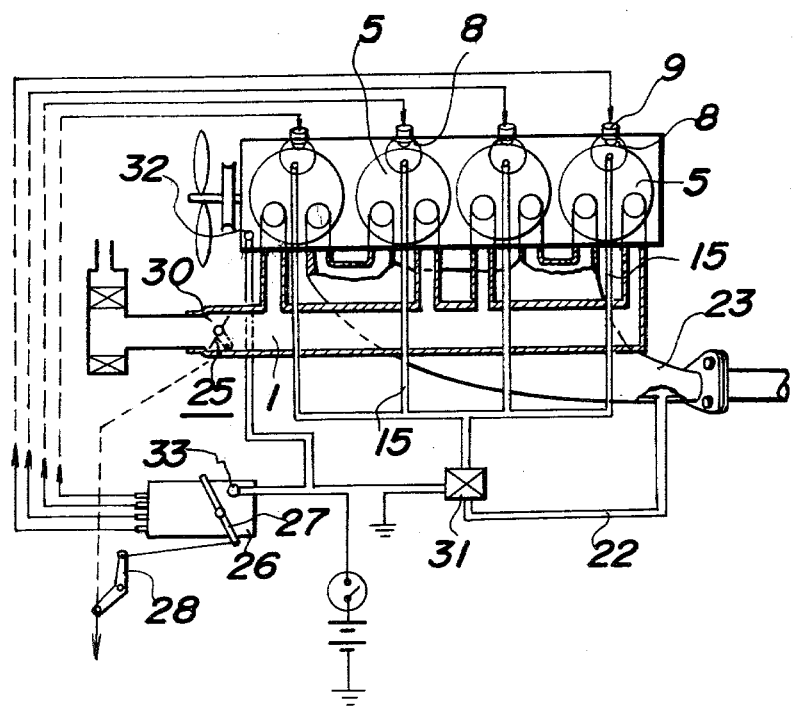

FIG_4
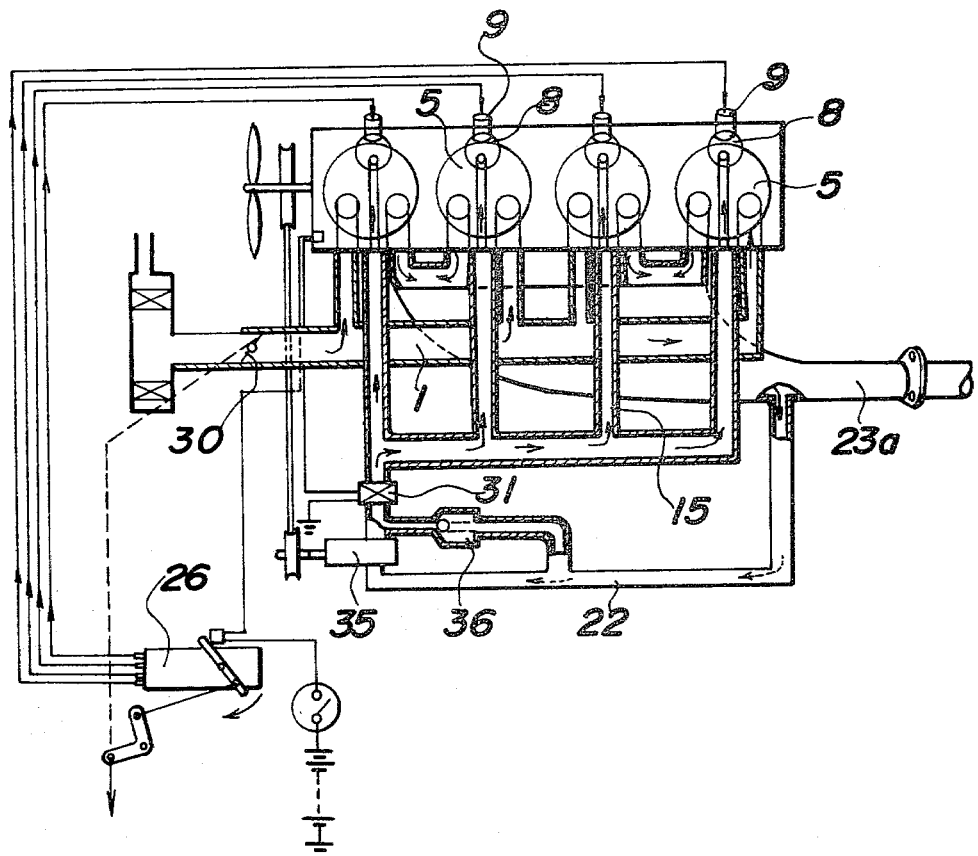
FIG_5
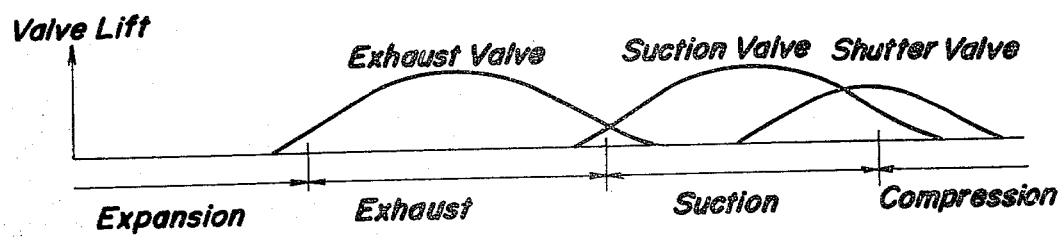

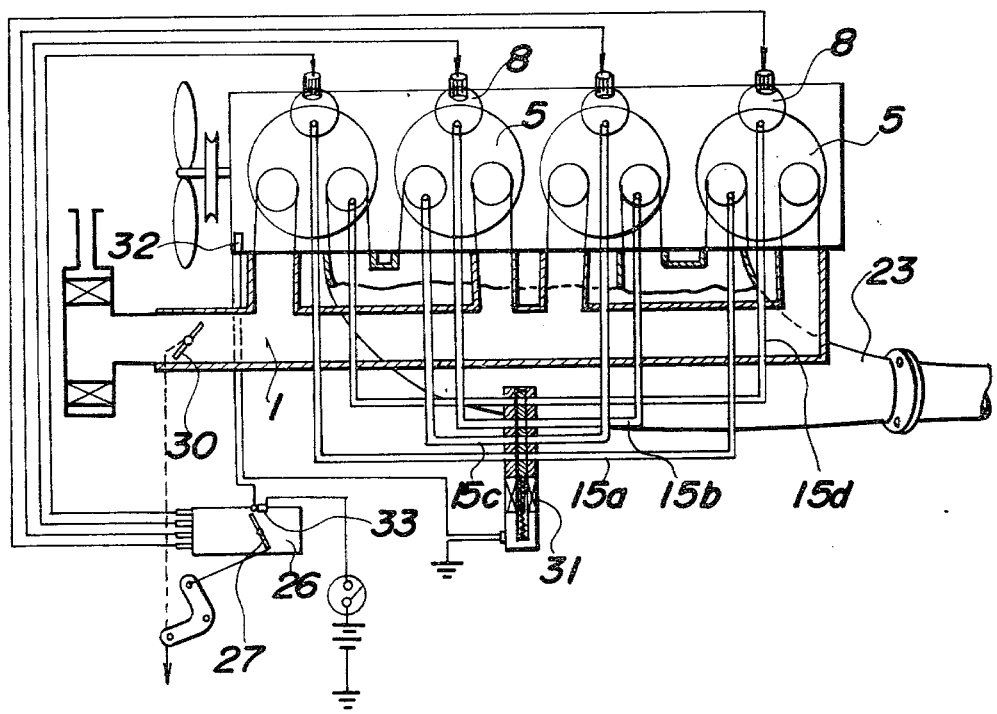
FIG_6

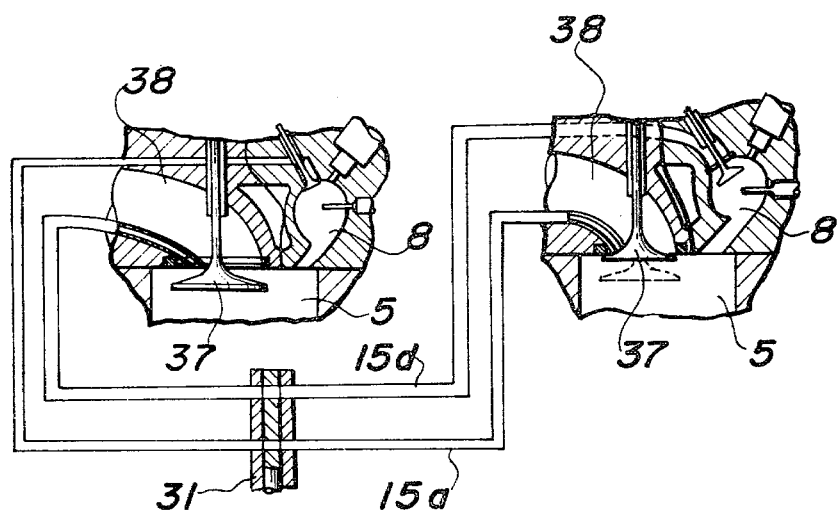
FIG_7

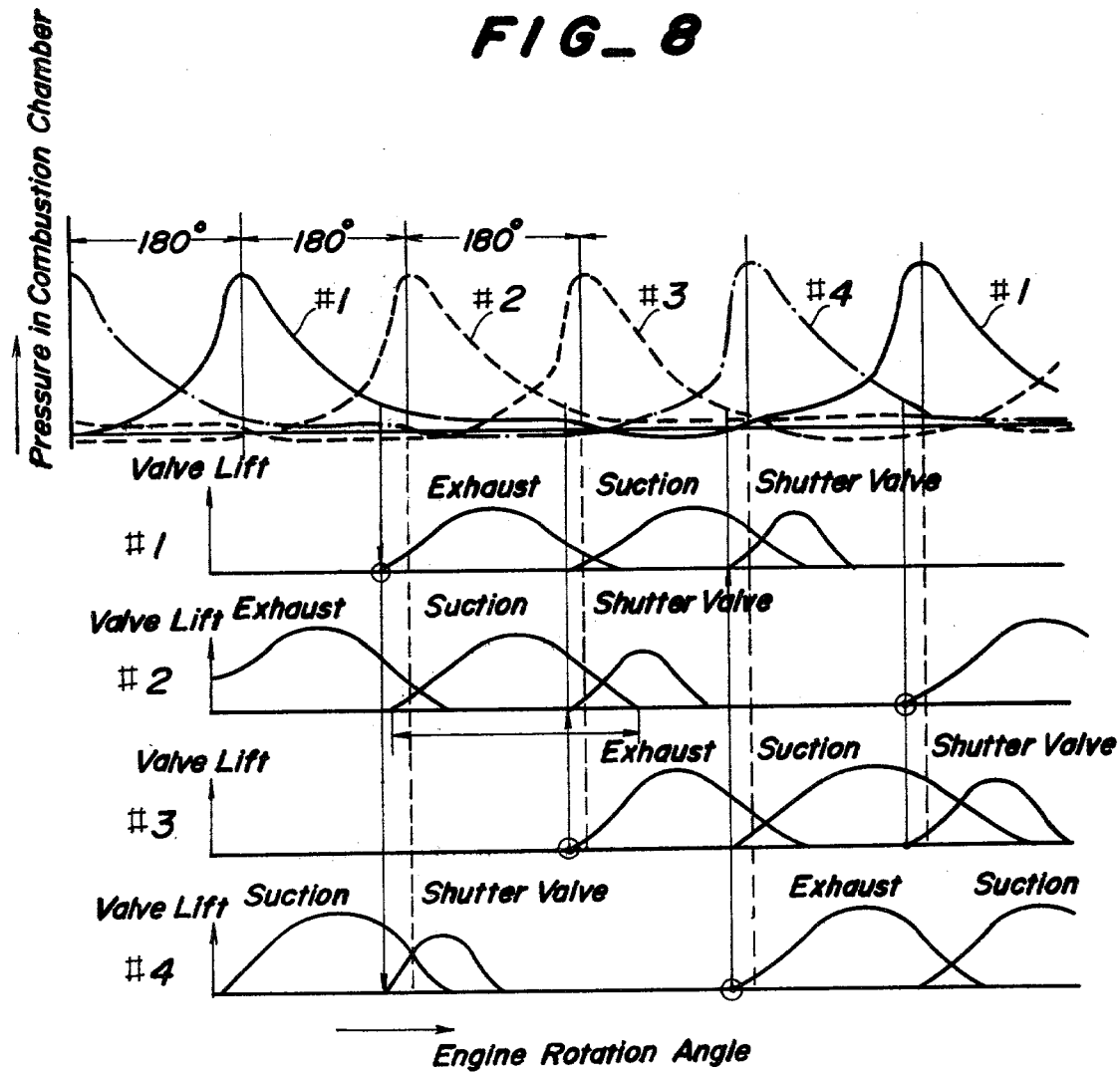
FIG_8

DIESEL ENGINE HAVING A SUBCHAMBER

BACKGROUND OF THE INVENTION

1. Field of the Invention

The present invention relates to a Diesel engine having a subchamber or a vortex chamber in the cylinder head and provided with an improved exhaust gas recirculating system.

2. Description of the Prior Art

In some conventional Diesel engines provided with a subchamber or a vortex chamber in the cylinder head, an exhaust gas recirculating system (hereinafter EGR) substantially as shown in FIG. 1 has been provided in order to decrease NOx products produced in the combustion stroke.

In such a conventional Diesel engine, an EGR passageway 2 is connected to an intake manifold 1 and a mixed gas of intake air and a recirculating exhaust gas is charged to a main combustion chamber 5 through an intake port 3 and an intake valve 4. Mist fuel is ejected from a fuel injection valve 9 into a vortex chamber 8 formed in a cylinder head 7 at the proximity of upper dead point in the compression stroke of a piston 6 and thus ejected fuel is further compressed and ignited in the mixed gas.

This system is designed to suppress formation of NOx by lowering the highest temperature of combustion with a substantial quantity of substantially inert EGR gas having high thermal capacity.

The combustion phenomenon of such a subchamber or vortex chamber type Diesel engine is mainly based upon diffusion combustion in which the flame is ejected into the main combustion chamber 5 together with unburned mist fuel with the increase of pressure through a nozzle or throat passage 10 after its ignition in the vortex chamber 8.

In such type of diffusion combustion, the propagation of the flame is not effected in the area where the mist fuel does not exist. This is quite different from the pre-mixed combustion in a gasoline engine in which a mixed gas is previously filled up in the combustion chamber.

For decreasing the production of the amount of NOx below a predetermined value by such an EGR system, it is necessary for the EGR gas to be present in the combustible region of the engine where the ejected mist fuel is located.

In a conventional system, the EGR gas is charged through the main combustion chamber 5. Accordingly, if the EGR gas concentration is to be maintained at a sufficiently high value in the vortex chamber 8 and in the region where the diffused mist fuel exists, there results an introduction of excess amount of the EGR gas over the whole area of the main combustion chamber 5.

Under certain condition of driving a vehicle equipped with such an engine, the rate of introduction of the EGR gas may reach up to 50% to 80%. The increase of the EGR gas, which may prevent perfect combustion, to such an extent results in an undesired increase of HC.CO even though the amount of NOx can be decreased.

It has been proposed to provide a thermal reactor or an oxidizing catalyst in the exhaust system of an engine for suppressing such increase of production of HC. However, in a Diesel engine, which has a lower exhaust gas temperature when compared with a gasoline engine, the reaction efficiency of such proposed systems is not sufficient. Accordingly, the conventional EGR system has difficulty in solving the problem of production of unburned HC.CO.

SUMMARY OF THE INVENTION

The present invention has for its object to solve the aforementioned problem in the conventional EGR system. The present invention has been obtained by realization of the fact that the combustion in such subchamber or a vortex chamber type Diesel engine is a diffusive combustion having its center in the vortex chamber and that the major portion of the exhausted NOx gas is produced at once in the beginning period of combustion by abrupt initial heat generation in the vortex chamber and by the high temperature gas resulting therefrom.

The present invention results to providing a subchamber or vortex chamber type Diesel engine having an EGR system capable of decreasing the production of the NOx effectively by eliminating the presence of an excess amount of EGR gas in the whole region of the combustion chamber by charging the EGR gas concentrically to the subchamber or the vortex chamber so that only the burning portion in the space is encircled by the EGR gas.

BRIEF DESCRIPTION OF THE DRAWINGS

FIG. 1 is a cross-sectional view of a main part of a conventional vortex chamber type Diesel engine;

FIG. 2 is a cross-sectional view of the corresponding portion of a first embodiment of a vortex chamber type Diesel engine made in accordance with the present invention;

FIG. 3 is a plan view thereof;

FIG. 4 is a plan view of an engine of a second embodiment of the present invention;

FIG. 5 is an explanatory diagram showing open and close timing of the valves;

FIG. 6 is a plan view of an engine of a third embodiment of the invention;

FIG. 7 is a cross-sectional view thereof, and

FIG. 8 is an explanatory diagram for showing mutual relation of the open and close timing of intake and exhaust valves of a four-cylinder engine.

DESCRIPTION OF THE PREFERRED EMBODIMENTS

In order to give a more clear understanding, the present invention will now be explained in more detail by reference to the drawing.

In the present invention, as can be seen from the first embodiment shown in FIGS. 2 and 3, the EGR passageway 15 is provided through a cylinder head 7 and is connected to the vortex chamber 8 through valve means 16.

As can be seen from the drawings, the valve means 16 comprises a cam mechanism 19 ganged with other cam mechanism 18 for operating to control opening and the closing of a suction valve 4 of the main combustion chamber 5 and a poppet type shutter valve 20 controlled by the cam mechanism 19. However, as an alternative, the valves may be replaced by electromagnetic valves or pressure responsive valves responding to the differential pressure between the exhaust pressure and the intake pressure.

In any case the opening time of the valve 20 of the valve means 16 should be set so as to introduce the EGR gas during a term starting from termination period of the suction stroke to the beginning period of the compression stroke in order that a substantial portion of the EGR gas may be kept only in the vortex chamber. For satisfying such requirement, the opening time of the shutter valve 20 is suitably adjusted based on the cam phase in the cam mechanism where a cam controlled shutter valve is used. If an electro-magnetic valve is used, the opening time is adjusted by means of an electric signal from a detecting device detecting the rotating angle of the cam shaft. Further, if a pressure responsive valve is used, it is adjusted by the produced differential pressure and which is further precisely controlled by the rotating angle for the operating period.

The EGR passage ways 15 connecting each of the vortex chambers 8 of the respective cylinders are jointly connected to an exhaust manifold 23 through a common passageway 22.

A Diesel engine is not equipped with a throttle valve like a gasoline engine. Diesel engines are generally arranged to respond to variations of the engine load by adjusting the amount of fuel injected.

Accordingly, the pressure difference between the intake manifold 1 and the exhaust manifold 23 is comparatively small. By this reason, the provision of a short-circuit path by the EGR passageway 15 between the two manifolds will not deliver a required amount of the recirculating exhaust gas (EGR gas) and control of the flow rate is also difficult.

In order to control the amount of the EGR gas at a suitable amount by producing a predetermined amount of intake negative pressure at the side of vortex chamber 8 in response to the driving condition, an EGR control device 25 is provided at the jointing portion of the intake manifolds 1. The EGR control device 25 comprises a throttle valve 30 which is driven by an interlocked link 28 and a control lever 27 of the fuel ejecting pump 26.

As can be seen from FIG. 3, the EGR control device 25 further comprises as its element, an electromagnetic valve 31 inserted intermediate EGR passageway 22. This electromagnetic valve 31 is energized from the source battery through a series circuit of a temperature responsive thermo switch 32 which turns when the temperature of the engine cooling water is condition lower than a predetermined temperature and a load switch 33 which shuts when the angle of the control lever 27 of the fuel injection pump is in a heavy load position.

FIG. 3 shows an essential portion of the engine made in accordance with the present invention. The same parts as those shown in FIG. 1 are shown by the same reference numerals and a duplicate explanation thereof is omitted.

In accordance with the construction of the present invention, the EGR gas flows into the subchamber or the vortex chamber 8 in the opening period of the shutter valve 20 of the vortex chamber 8 for a period between the terminating period of the intake stroke and the beginning period of the compression stroke in proportion to the suction negative pressure generated by the opening of the throttle valve and by the number of rotation at that time.

The EGR gas is exclusively introduced into the vortex chamber 8 immediately before the beginning of upward motion of the piston 6 and a substantial portion thereof is kept in the vortex chamber by an upward air stream forced to flow into the vortex chamber 8 through the throat passage 10 in the compression stroke. This means that flow of EGR gas into the main combustion chamber 5 during the above period is prevented.

Under such conditions when the EGR gas is exclusively introduced into the vortex chamber 8, the fuel is ejected into the vortex chamber 8 and ignited. Then while suppressing the burning suitably, the flame propagates toward the main combustion chamber 5 through the throat passage 10. At this time, since there is not an excess amount of the EGR gas in the main combustion chamber 5, the mist fuel is stably and completely burned under the pressure of sufficient fresh air.

In the beginning period of the combustion, the NOx gas, large amounts of which had been produced in the conventional system, is remarkably suppressed by the presence of the inert EGR gas as mentioned above. Further since there is no excess amount of EGR gas in the main combustion chamber, the diffusive combustion of the fuel is effected very smoothly which results in a remarkable decrease in the production of HC products.

The EGR gas supply should be made sufficient in the low to middle load region which are used most frequently. In this region, the opening of the throttle valve 30 is comparatively small, which results in a considerable amount of intake negative pressure and hence a sufficient amount of the EGR gas is introduced by the large negative differential pressure acting on the EGR passageway 15.

When high output power is required during starting or rapid acceleration or the like, the throttle valve 30 opens widely to prevent lowering of the charging efficiency of the intake air and also to decrease the amount of the EGR gas by suppressing the intake negative pressure in order that a sufficiently large output power of the engine is assured.

At a very heavy load when the load switch 33 of the fuel pump is operated to turn off, the electromagnetic valve 31 is released to interrupt the EGR gas to produce a larger full admission output.

The electromagnetic valve 31 also releases by turning off of the thermo switch 32 when the engine is in cold condition to disconnect the EGR gas to accelerate warming up of the engine.

Then in order to facilitate introduction of a minimum required amount of the EGR gas into the vortex chamber 8, it is necessary to make the leakage amount of the EGR gas from the vortex chamber 8 to the main combustion chamber 5 substantially zero during the suction stroke through the throat passage 10.

For this purpose, it is necessary to operate the shutter valve 30 of the vortex chamber 8 comparatively lagged from the operation of the intake valve 4 of the main combustion chamber 5.

The cylinder pressure becomes nearly equal to the atmospheric pressure or greater than it during the time from the terminating period of the suction stroke to the beginning period of the compression stroke. Accordingly, opening of the shutter valve 30 during this period will not result in an introduction of sufficient amounts of EGR gas.

To avoid such a situation, a pump 35 operated in synchronism with the engine rotation may be provided upstream of the electromagnetic valve 31 as shown in FIG. 4 and the EGR gas may be supplied under pressure. In FIG. 4, reference numeral 36 shows a relief valve which opens to feed the exhausted EGR gas to the intake side of the pump 35. The relief setting pressure may be set in proportion to the engine load. In such cases, the relief valve may initiate the relief operation when the pressure of the vortex chamber side becomes higher than a predetermined value in a heavy load condition.

FIGS. 6 and 7 show another embodiment of the present invention, in which the EGR action is effected by using the high exhaust gas pressure produced immediately after the opening of the exhaust valve 37.

For instance, in a four cycle four cylinder engine, combustion of each cylinder takes place in succession in each two rotation.

In a four cylinder engine having its order of fuel ejection as #1-#3-#4-#2 of cylinders, the beginning period of the exhaust stroke of the #1 cylinder overlapps with the terminating period of the suction stroke of the #4 cylinder and likewise #3 and #2, #4 and #1, #2 and #3 cylinders overlaps each other in succession.

As can be seen from FIG. 6, the EGR passageway 15d of #4 cylinder is coupled to the exhaust port 38 of #1 cylinder. Similarly the EGR passageway 15c of #3 cylinder is coupled to that of #2 cylinder, the EGR passageway 15b of #2 cylinder is coupled to that of #3 cylinder and the EGR passageway 15a of #1 cylinder is coupled to that of #4 cylinder.

The intake port of the respective EGR passageways 15a to 15d is provided at a location near the respective exhaust valve 37 in order that the EGR gas is more effectively forced into the respective vortex chamber in the order by the dynamic pressure at the initial term of valve opening period.

FIG. 7 shows coupling of EGR passageways 15a and 15d belonging to #2 and #4 cylinder.

By this arrangement the recirculation of the necessary amount of EGR gas becomes possible without providing a pump 35 as is the previous case shown in FIG. 4.

It is preferable to provide a counter flow preventing valve such as a lead valve between the EGR passageways 15a-15d for preventing counter flow caused by exhaust pulsation.

If an electromagnetic valve 31' is formed to open or close all the EGR passageways 15a-15d simultaneously, only one valve may be used.

According to a further aspect of the present invention, when an electromagnetic valve which operates in synchronism with the engine rotating angle as the valve means, the simultaneous control of the EGR gas amount is possible without provision of the electromagentic valve 31 in the accumulated passageway 23 by inserting a thermo switch 32 and a load switch 33 in the operating circuit.

In this case, however, the electromagnetic valves should be provided in each one of the EGR passageways 15.

As has been explained in the foregoing system of the present invention, when the EGR gas is exclusively introduced into the vortex chamber, the generation of NOx can effectively be decreased by the minimum required amount of EGR gas and also the generation of unburned gas such as HC.CO or the like can substantially be suppressed. In addition, combustion noise will decrease by preventing a sudden pressure rise at the beginning period of the combustion.

Further by preventing introduction of surplus amount of the EGR gas into the main combustion chamber and to limit it at sufficient extent, the utilization factor of the air at a late period of combustion becomes higher which may further contribute to suppress the generation of smoke caused for instance by blowing off of the combustion flame.

What is claimed is:

1. A Diesel engine having a subchamber in its cylinder head, comprising an exhaust gas recirculating passageway connecting an exhaust system of the engine to said subchamber for recirculating an exhaust gas of the engine, valve means operating in synchronism with rotation of said engine to open and to close said recirculating gas passageway, wherein the exhaust gas recirculating passageway is interposed with a pump driven in synchronism with the engine rotation, and controlling means for adjusting an amount of said recirculating exhaust gas in response to respective load conditions of the engine, wherein the exhaust gas recirculation is effected during a term starting from suction stroke of the engine to a beginning period of compression stroke of the engine.

2. In a diesel engine having a subchamber, an exhaust gas recirculating passageway connecting an exhaust system of the engine to said subchamber for charging an exhaust gas of the engine substantially, exclusively into said subchamber during the interval initiated by the engine suction stroke and extending to a beginning period of the engine compression stroke, and valve means operating in synchronism with rotation of the engine to open and close said recirculating gas passageway:
controlling means for adjusting an amount of said recirculating exhaust gas in response to respective load conditions of the engine, said controlling means including an electromagnetic valve in the exhaust gas recirculating passageway and a thermoswitch for closing said electromagnetic valve to interrupt the exhaust gas recirculation when the engine is in a cold state.

3. A diesel engine according to claim 2, including means for detecting rotational position of the engine wherein the valve means comprises an electromagnetic valve operated in response to a signal obtained from said position detecting means.

4. A diesel engine according to claim 2, including a fuel injection pump having a control lever, wherein said controlling means comprises an electromagnetic valve interposed in the exhaust gas recirculating passageway and a load switch for detecting an angle of said fuel injection pump control lever, said controlling means closing the electromagnetic valve to interrupt the exhaust gas recirculation when the engine is in a heavy load condition.

5. A diesel engine according to claim 2, wherein the controlling means comprises a throttle valve provided in an intake passageway of said engine for responding to an operating condition of the engine, an electromagnetic valve interposed in the exhaust gas recirculating passageway, a thermoswitch for closing the electromagnetic valve when the engine is in cold state, and a load switch for closing the electromagnetic valve when the engine is in a heavy load condition.

* * * * *